United States Patent
Ahmed et al.

(10) Patent No.: US 9,965,516 B2
(45) Date of Patent: May 8, 2018

(54) OUTER-JOINED AND CROSS-JOINED TABLE ELIMINATION FOR DUPLICATE-INSIGNIFICANT QUERIES

(71) Applicant: Oracle International Corporation, Redwood Shores, CA (US)

(72) Inventors: Rafi Ahmed, Fremont, CA (US); Gautam Kumar Parai, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 360 days.

(21) Appl. No.: 14/284,248

(22) Filed: May 21, 2014

(65) Prior Publication Data

US 2015/0339349 A1    Nov. 26, 2015

(51) Int. Cl.
*G06F 17/30* (2006.01)

(52) U.S. Cl.
CPC .. *G06F 17/30489* (2013.01); *G06F 17/30466* (2013.01)

(58) Field of Classification Search
CPC ......... G06F 17/30466; G06F 17/30463; G06F 17/30424; G06F 17/30442; G06F 17/30445; G06F 17/30448; 17/30454; G06F 17/3046; G06F 17/30471; G06F 17/30477; G06F 17/30489; G06F 17/30498; G06F 17/30545; G06F 17/30589

USPC ................................................. 707/718, 714
See application file for complete search history.

(56) References Cited

U.S. PATENT DOCUMENTS

| | | | | |
|---|---|---|---|---|
| 5,797,136 | A * | 8/1998 | Boyer | G06F 17/30421 |
| 7,908,242 | B1 * | 3/2011 | Achanta | G06F 17/30442 |
| | | | | 707/602 |
| 2003/0167258 | A1* | 9/2003 | Koo | G06F 17/30451 |
| 2006/0282422 | A1* | 12/2006 | Al-Omari | G06F 17/30466 |
| 2009/0070315 | A1* | 3/2009 | Ahmed | G06F 17/30492 |
| 2010/0293161 | A1* | 11/2010 | Poppe | G06F 17/30448 |
| | | | | 707/736 |

* cited by examiner

*Primary Examiner* — Evan Aspinwall
(74) *Attorney, Agent, or Firm* — Hickman Palermo Becker Bingham LLP

(57) ABSTRACT

A method and apparatus for outer-joined and/or cross-joined table elimination for duplicate-insignificant queries is provided. A query block of a query specifies a join between a first table and a second table. The join is one of an outer join and a cross join. A first determination is made that the query block contains no references to the second table to be processed after the join. A second determination is made that the query block is duplicate-insignificant. In response to making the first determination and the second determination, the query block is transformed into a transformed query, where the second table is eliminated from a corresponding query block in the transformed query.

18 Claims, 3 Drawing Sheets

OUTER-JOINED AND CROSS-JOINED TABLE ELIMINATION FOR DUPLICATE-INSIGNIFICANT QUERIES

FIELD OF THE INVENTION

The present invention relates to database systems and, in particular, to optimization of queries executed by a database system.

BACKGROUND

Relational and object-relational database management systems store information in tables in a database. To retrieve data, queries that request data are submitted to a database server, which computes the queries and returns the data requested. Query statements submitted to the database server should conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that is optimized for efficient execution. The optimized execution plan may be based on a rewrite of the query into a semantically equivalent but more efficient form.

For example, a query may be rewritten when it contains logically unnecessary operations. This type of inefficiency occurs in queries for many reasons. For example, database users often do not write queries directly, but rather utilize "middleware" software programs. Such middleware software programs receive declarative input from the user and automatically generate queries based on the declarative input. Often, the "middleware" software does not check whether the generated queries are optimized. In addition, a human application developer may also introduce inefficient queries.

SQL supports join operations, which combine the contents of two tables. Specific join operations will be described in greater detail herein. Unnecessary joins are undesirable because join operations are expensive operations for a database system to execute. Therefore, it is desirable to develop techniques for rewriting queries to eliminate tables from queries by removing join operations in the queries which contain the tables when such removals have no logical impact on the query results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1A:
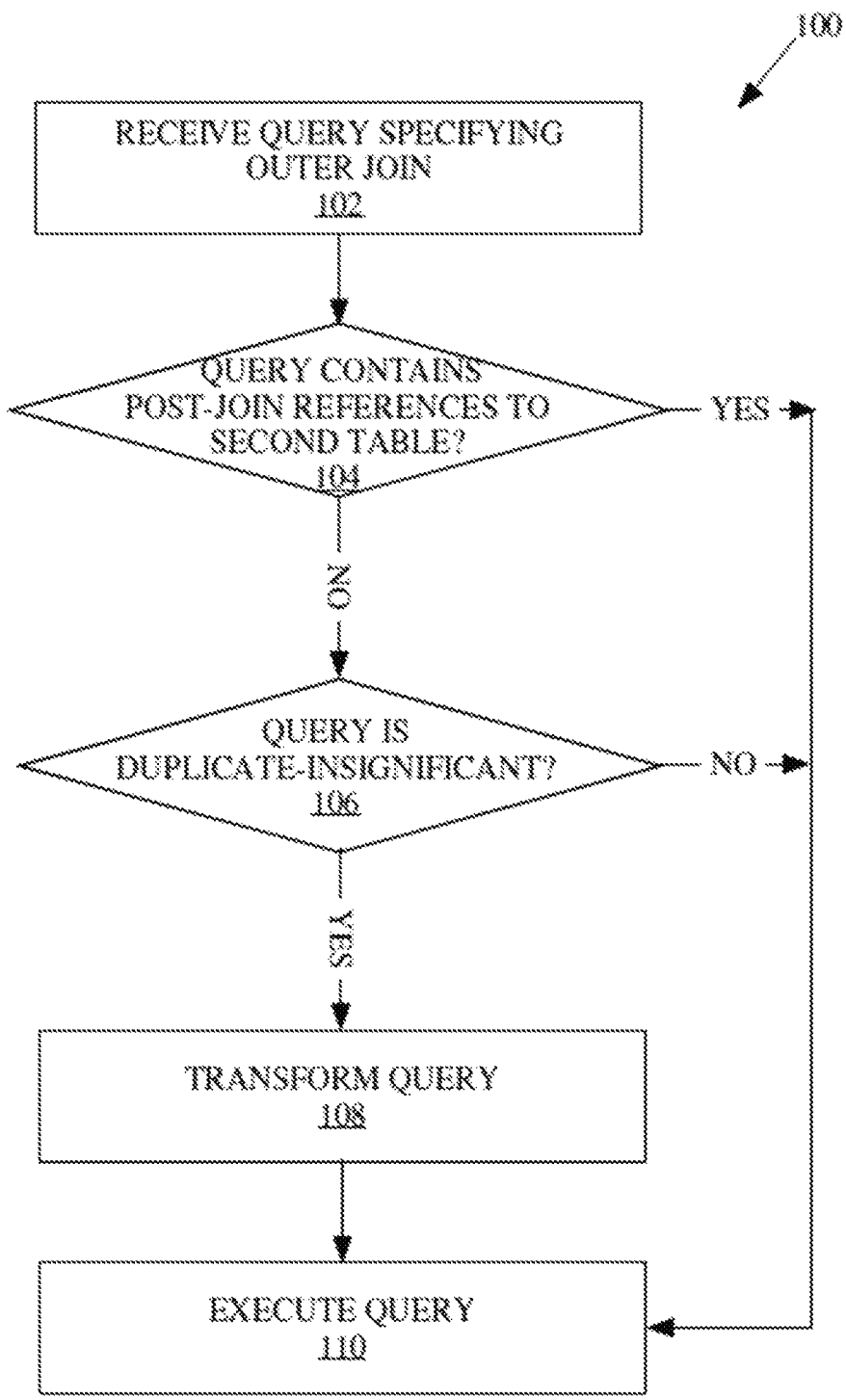
FIG. 1A is a flow diagram that illustrates an embodiment of a process for outer-joined table elimination for duplicate-insignificant queries.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods, stored instructions, and computer systems are provided for outer-joined and cross-joined table elimination for duplicate-insignificant queries. When the conditions for outer-joined table elimination and/or cross-joined table elimination are satisfied, a query may be transformed or otherwise rewritten to make the query more efficient to process. Thus, query execution time and other database resources are conserved.

In one embodiment, a query having a query block that includes a single-sided outer join is evaluated to determine whether outer-joined table elimination may be performed. As used herein, the term "outer-joined table elimination" refers to the removal, from a query block, of a non-preserved table of a single-sided outer join operation (i.e. an outer join operation with a preserved table and a non-preserved table). The removal of the non-preserved table also results in the removal of the outer-join operation from the query.

In one embodiment, a query having a query block that includes a cross join (or Cartesian product) is evaluated to determine whether cross-joined table elimination may be performed. As used herein, the term "cross-joined table elimination" refers to the removal, from a query block, of a cross-joined table. The removal of the cross-joined table also results in the removal of the corresponding Cartesian product operation from the query.

Outer-joined table elimination may be performed on a query block when the following conditions are satisfied: (1) the query block contains no references to the non-preserved table to be processed after the outer join, and (2) the query block is duplicate-insignificant. Cross-joined table elimination may be performed on a query block when the following conditions are satisfied: (1) the query block contains no references to the second cross-joined table to be processed after the cross join, and (2) the query block is duplicate-insignificant.

As used herein, in the context of describing a query, the term "duplicate-insignificant" refers to a query block where duplicates are considered semantically insignificant. Duplicate-insignificant query blocks shall be explained in further detail herein, along with a number of non-limiting examples.

For a query block with a single-sided outer join, outer-joined table elimination of the non-preserved table can be performed in duplicate-insignificant query blocks because every row of the remaining table is preserved. Furthermore, the property of duplicate-insignificance ensures that additional rows of the preserved table generated by the inner join component of the outer join are not significant, since these rows either are removed or do not alter the semantics in a duplicate-insignificant query block.

For a query block with a cross join, cross-joined table elimination of a selected cross-joined table can be performed in duplicate-insignificant query blocks because every row of all the remaining tables is preserved. Furthermore, the property of duplicate-insignificance ensures that additional rows of all other tables that are generated by the Cartesian product are not significant, since these rows either are removed or do not alter the semantics in a duplicate-insignificant query block.

The single-sided outer join is a very common class of join operation that is used in most applications. Outer-joined and cross-joined table elimination, as described herein, can provide extremely significant performance gain for a large class of queries since non-preserved table access and the associated joins are completely removed.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation.

The query may perform operations on data from the source data object(s) on a row-by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement. The internal query representation may be in the form of a graph of nodes, each interlinked data structure corresponding to a node and to a component of the represented query statement. The internal representation is typically generated in memory for evaluation, manipulation, and transformation.

Query Optimization

As used herein, a query is considered "transformed" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by transforming the query. In general, transforming a query involves rewriting a query into another query that produces the same result and that can potentially be executed more efficiently, i.e. one for which a potentially more efficient and/or less costly execution plan can be generated. A query may be rewritten by manipulating any internal representation of the query, including any copy thereof, to form a transformed query or a transformed query representation. Alternatively and/or in addition, a query may be rewritten by generating a different but semantically equivalent database statement.

Join Operations

A query may include an operation to combine rows from multiple tables, including instances of the same table. An operation that combines rows from one or more tables is called a join operation. A join operation may be specified in a SELECT statement of a query as well as inside a subquery. ANSI-standard SQL syntax specifies five types of join operations: INNER, LEFT OUTER, RIGHT OUTER, FULL OUTER and CROSS between a left table and a right table. An INNER JOIN operation returns all pairings of rows from the left table and the right table. A LEFT OUTER JOIN operation preserves all rows from the left table. A RIGHT OUTER JOIN operation preserves all rows from the right table. A FULL OUTER JOIN operation preserves all rows from both tables. A CROSS JOIN operation returns the Cartesian product of rows from tables in the join. Below, the LEFT OUTER JOIN and the RIGHT OUTER JOIN will be described in greater detail.

Although the ANSI-standard SQL syntax is used in one or more examples provided, any query syntax capable of describing the corresponding operations is compatible with the techniques described herein.

Below, example query Q1 illustrates the basic syntax for a join operation between tables T1 and T2, where the type of join is specifiable in the field [join type] (i.e. INNER, LEFT OUTER, RIGHT OUTER, FULL OUTER, or CROSS). Example query Q1 includes various clauses for illustration purposes; the techniques described herein may be performed on a query that does not include every clause shown in example query Q1, and/or a query that includes additional clauses not illustrated in example query Q1.

Example Query Q1:
Q1=SELECT [column/s]
    FROM T1 [join type] JOIN T2
    ON [join condition/s and/or filter condition/s]
    WHERE [join condition/s and/or filter condition/s];

In the SELECT clause of the query, the columns to return are specified. A query includes a list of columns to be included in the final result immediately following the SELECT keyword. An asterisk ("*") can also be used to specify that the query should return all columns of the queried tables.

In the FROM clause of the query, the relations to join are specified. In example query 1, the tables to join are T1 and T2. The term "table" is used in the FROM clause of one or more example queries described herein. However, another type of relation may be specified for joining in the FROM clause, such as a view, a subquery, an expression, or any other data object or reference thereto.

In the ON clause of the query, one or more join conditions may be specified. A join condition is an expression that is evaluated during the join operation. The join condition/s specify which rows to combine from T1 and T2. For example, a foreign key column of T1 may correspond to a primary key column of T2.

In the WHERE clause of the query, one or more filter conditions and/or one or more join conditions may be specified. A filter condition is a predicate (i.e. an expression)

that is evaluated after the join operation. After the join operation is performed, the filter condition/s are evaluated. Rows that do not satisfy the filter condition/s are eliminated from the result set.

Although join conditions and filter conditions are specified in separate clauses of the query in the ANSI-standard SQL syntax, other syntaxes may use other indicators to indicate when the predicate is evaluated. For example, both join condition/s and filter condition/s may be specified in the ON clause of the query. In this case, join condition/s and filter condition/s may be specified using other syntaxes. Alternatively and/or in addition, whether the predicate is evaluated during the join operation (e.g. join condition) or after the join operation (e.g. filter condition) may be determined logically, such as by a query parser.

The conditions specified by predicates, including join conditions and filter conditions, may include equality, inequality, or other comparison operators that evaluate to TRUE, FALSE, or UNKNOWN. Example operators in conditions may include, but are not limited to, equals, greater than, less than, greater than or equal to, less than or equal to, is null, is not null, is not equal to, and the case operator. Conditions in predicate(s) may be related to each other with logical operators such as AND (for "conjunctive predicates") or OR (for "disjunctive predicates"). The "AND" operators connect two predicates to form a complex predicate that is satisfied when both of the connected predicates are satisfied. The "OR" operator connects two predicates to form a complex predicate that is satisfied when either or both of the connected predicates are satisfied. Further, subset(s) of the predicates may appear inside of parenthesis, indicating that these subset(s) are to be processed together, and results of these subsets are to be AND-ed or OR-ed with other predicates that appear outside of the parenthesis. Subset(s) of predicates may be nested inside one or more layers of parentheses, and these layers further complicate the logic that is to be applied for each row of the source(s) for the query. Predicates and logical combinations of predicates may be negated by the "NOT" operator. For example, an operator or combination thereof that would have returned "TRUE" would instead return "FALSE," and vice versa, if modified by the "NOT" operator.

Left Outer Join

When a left table and a right table are joined by a left outer join, the left outer join preserves all rows from the left table. In this case, the left table is the preserved table, and the right table is the non-preserved table. The result of a left outer join for a left table and a right table always contains all rows of the left table, even if, evaluating the join condition/s results in no matching rows in the right table.

Below, example query Q2 illustrates the basic syntax for a left outer join operation between left table T1 and right table T2. Example query Q2 includes various clauses for illustration purposes; outer-joined table elimination may be performed on a query that does not include every clause shown in example query Q2, and may include additional clauses not illustrated in example query Q2.

Example Query Q2:
Q2=SELECT [column/s]
FROM T1 LEFT OUTER JOIN T2
ON [join condition/s and/or join condition/s]
WHERE [filter condition/s and/or join condition/s];

Example query Q2 returns a complete set of rows from left-joined (preserved) table T1, with matched rows, where available, in the right-joined (non-preserved) table T2. The zero or more join conditions specified in the optional ON clause, when present, are evaluated during the left outer join operation. The zero or more filter conditions specified in the optional WHERE clause, when present, are evaluated after the left outer join operation.

Right Outer Join

A right outer join (or right join) closely resembles a left outer join, except with the treatment of the tables reversed. When a left table and a right table are joined by a right outer join, the right outer join preserves all rows from the right table. In this case, the left table is the non-preserved table, and the right table is the preserved table.

A right outer join may be transformed or otherwise rewritten in the form of a left outer join. For consistency, one or more examples of outer-joined table elimination discussed herein are described with respect to one or more left outer join operations, but are applicable to right outer join operations, either by transforming or otherwise rewriting one or more right outer joins, or by modifying one or more processes to treat the right table as the preserved table and the left table as the non-preserved table.

Cross Join

A cross join returns the Cartesian product of rows from the joined tables. A cross join combines each row from a first table with each row from a second table.

Below, example query Q3 illustrates the basic syntax for a cross join operation between table T1 and table T2. Example query Q3 includes various clauses for illustration purposes; cross-joined table elimination may be performed on a query that does not include every clause shown in example query Q3, and may include additional clauses not illustrated in example query Q3.

Example Query Q3:
Q3=SELECT [column/s]
FROM T1 CROSS JOIN T2
WHERE [filter condition/s];

Example query Q3 illustrates an explicit cross join. The cross join may also be written as an implicit cross join, i.e. as shown in example query Q3'.

Example Query Q3':
Q3'=SELECT [column/s]
FROM T1, T2
WHERE [filter condition/s];

In a cross join, each row from the first table joins with all rows of the second table, or the Cartesian product of the tables involved in the join. The cardinality of the result set of a Cartesian product is the rows(T1)×rows(T2). For example, if T1 contains rows A, B and C, while T2 contains rows D and E, the cross join operation of query Q3 would return rows A-D, A-E, B-D, B-E, C-D and CE (no ordering is implied).

The zero or more filter conditions specified in the optional WHERE clause, when present, may be evaluated either before or after the cross join operation without changing the semantics of the query.

Outer-Joined Table Elimination

Outer-joined table elimination can be performed with respect to the non-preserved table of a single-sided join operation if the following two conditions are satisfied: (1) the query contains no references to the non-preserved table to be processed after the outer join, and (2) the query is duplicate-insignificant. When these two conditions are satisfied, a transformed query can be generated that is semantically equivalent to the original query. In the transformed query, all references to the non-preserved table are eliminated, including the single-sided join operation between the preserved table and the non-preserved table.

Cross-Joined Table Elimination

Cross-joined table elimination can be performed with respect to a particular cross-joined table of a Cartesian product operation if the following two conditions are satisfied: (1) the query contains no references to a particular crossed-joined table to be processed after the Cartesian product, and (2) the query is duplicate-insignificant. When these two conditions are satisfied, a transformed query can be generated that is semantically equivalent to the original query. In the transformed query, all references to the particular cross-joined table are eliminated, including Cartesian product operation between the cross-joined table and all other tables.

Each condition is discussed in greater detail below, along with a number of example queries included for the purposes of illustrating outer-joined table elimination.

Post-Join References to Non-Preserved Table

One condition for performing outer-joined table elimination and/or cross-joined table elimination, as described herein, is that the query contains no references to the second table to be processed after the outer or cross join. As used herein, the term "post-join reference" refers to a reference to a table to be processed after a join or Cartesian product operation is performed, where the referenced table is a candidate table for removal using outer-joined table elimination and/or cross-joined table elimination.

As described above, post-join references may appear in the ON and/or WHERE clauses of a query. Additionally, a post-join reference to a candidate table for removal may be found in the SELECT, GROUP-BY, HAVING, ORDER-BY clauses or in subquery connecting and/or correlating conditions. In a single-sided outer join between a preserved table and a non-preserved table, if columns of the non-preserved table are referenced in the SELECT clause, these qualify as a post-join reference, and the conditions for performing outer-joined table elimination are not satisfied. Example query Q4 contains a predicate "T1.x=T2.x" that is processed during the join. However, although this predicate is not a post-join reference, query Q4 does contains a post-join reference to the non-preserved table T2 in the SELECT clause, "T2.y". Therefore, outer-joined table elimination may not be performed on example query Q4.

Example Query Q4:
Q4=SELECT DISTINCT T1.x, T2.y
FROM T1 LEFT OUTER JOIN T2
ON T1.x=T2.x;

A post-join reference to the non-preserved table may also be found in one or more filter conditions. As noted above, a filter condition may appear in the WHERE clause of a query written in the ANSI-standard SQL syntax. A filter condition may also appear in other portions of the query, such as in the ON clause, depending on the syntax used. When a query includes a post-join reference to the non-preserved table, the conditions for performing outer-joined table elimination are not satisfied. Example query Q5 contains a post-join reference to the non-preserved table in the WHERE clause.

Example Query Q5:
Q5=SELECT DISTINCT T1.d, T1.z
FROM T1 LEFT OUTER JOIN T3
ON (T1.y=T3.y)
WHERE T3.m>13;

In example query Q5, the filter predicate "T3.m>13" is a post-join reference to the non-preserved table T3, and the conditions for performing outer-joined table elimination are not satisfied. In contrast, in example query Q6, the same predicate is treated as a join condition, and thus the conditions for performing outer-joined table elimination are satisfied.

Example Query Q6:
Q6=SELECT DISTINCT T1.d, T1.z
FROM T1 LEFT OUTER JOIN T3
ON (T1.y=T3.y and T3.m>11);

Duplicate-Insignificant Queries

Another condition for performing outer-joined table elimination, as described herein, is that the query block is duplicate-insignificant. As used herein, in the context of describing a query block, the term "duplicate-insignificant" refers to a query block where duplicates are semantically insignificant. In a duplicate-insignificant query block, the number of duplicate rows is considered insignificant.

For an outer join, outer-joined table elimination of the non-preserved table can be performed in duplicate-insignificant queries with a single-sided outer join operation because every row of the remaining table is preserved. Furthermore, the property of duplicate-insignificance ensures that additional rows of the remaining table that are generated by the inner join component of the outer join are not significant, since these rows either are removed or do not alter the semantics in a duplicate-insignificant query block.

For a cross join, cross-joined table elimination of a cross-joined table can be performed in duplicate-insignificant queries because every row of all the remaining tables is preserved; furthermore, the property of duplicate-insignificance ensures that additional rows of all other tables that are generated by the Cartesian product are not significant, since these rows either are removed or do not alter the semantics in a duplicate-insignificant query block.

The following non-limiting list includes query blocks that are duplicate-insignificant:

Query blocks with the DISTINCT operator, unless the SELECT clause contains rownum, or non-duplicate-insignificant aggregate functions such as COUNT( ), AVG( ) and SUM( )

Query blocks with a distinct aggregate function, MIN( ), MAX( ), SUM(DISTINCT), COUNT(DISTINCT), or AGGREGATE (DISTINCT) aggregate functions without a GROUP-BY clause such that all items of the GROUP-BY clause also appear in the SELECT clause;

Query blocks with no aggregate functions and a GROUP-BY clause such that all items of the GROUP-BY clause also appear in the SELECT clause;

All branches of UNION, INTERSECT, and MINUS query blocks;

Semi-joined and anti-joined views, which may originate from subquery unnesting transformations;

ANY, ALL, [NOT] IN, and [NOT] EXISTS subqueries; and any other duplicate-insignificant query block.

Semi-joined and anti-joined views are further described in U.S. patent application Ser. No. 13/603,302, filed Sep. 4, 2012, which is hereby incorporated by reference in its entirety. The duplicate-insignificant property may be inherited recursively from the containing query block by views and by the branches of UNION ALL query blocks.

Example Transformed Queries

Consider example query Q7, provided below:

Example Query Q7:
Q7=SELECT DISTINCT T1.d, T1.z
FROM T1 LEFT OUTER JOIN T3
ON (T1.y=T3.y and T3.m>11)
WHERE T1.n>5;

Example query Q7 contains the DISTINCT operator and thus duplicates are considered insignificant. Example query Q7 also contains no post-join references to the non-preserved table T3. Because example query Q7 satisfies both conditions for outer-joined table elimination, outer-joined table elimination can be performed, yielding transformed query Q7', provided below. Transformed query Q7' is semantically equivalent to example query Q7.

Transformed Query Q7':
Q7'=SELECT DISTINCT T1.d, T1.z
   FROM T1
     WHERE T1.n>5;

Consider example query Q8, provided below:
Example Query Q8:
Q8=SELECT T1.d, MAX(T2.z)
   FROM T1 JOIN T2 ON (T1.x=T2.x) LEFT OUTER JOIN T3
     ON (T1y=T3.y and T2.h=T3.h and T3.m>11)
     WHERE T2.k>5
     GROUP BY T1.d;

The LEFT OUTER JOIN of example query Q8 satisfies the duplicate-insignificant property, since every item in the GROUP-BY clause appears in the SELECT clause and the aggregate function, MAX( ), is invariant over duplicate rows. Further, the query contains no non-post-join references to non-preserved table T3. Thus, T3 can be removed from example query Q8, which yields the following transformed query Q8', where transformed query Q8' is semantically equivalent to example query Q8:

Transformed Query Q8':
Q8'=SELECT T1.d, MAX(T2.z)
   FROM T1, T2
     WHERE T1.x=T2.x and T2.k>5
     GROUP BY T1.d;

Consider example query Q9, provided below:
Example Query Q9:
Q9=SELECT DISTINCT T1.d, T2.e
   FROM T1 INNER JOIN T2
     ON (T1.z=T2.z and T1.k>5)
      LEFT OUTER JOIN T3
        ON (T3.h>7 and (T3.x=T1.x OR T3.y>T2.Y));

Example query Q9 satisfies both the conditions for outer-joined table elimination. Eliminating the non-preserved table T3 yields transformed query Q9':

Transformed QuerY Q9':
Q9'=SELECT DISTINCT T1.d, T2.e
   FROM T1, T2
     WHERE T1.z =T2.z and T1.k>5;

Consider example query Q10, provided below:
Example Query Q10:
Q10=SELECT DISTINCT T1.d, T1.z
   FROM T1 CROSS JOIN T3;

Example query Q10 contains the DISTINCT operator and thus duplicates are considered insignificant. Example query Q10 also contains no post-join references to the cross-joined table T3. Because example query Q10 satisfies both conditions for cross-joined table elimination with respect to table T3, cross-joined table elimination can be performed, yielding transformed query Q10', provided below. Transformed query Q10' is semantically equivalent to example query Q10.

Transformed Query Q10':
Q10'=SELECT DISTINCT T1.d, T1.z
   FROM T1;

Table Elimination Cascade

In one embodiment, when a query includes multiple single-sided outer join operations and/or cross-join operations, the conditions for performing the outer-join table elimination and/or cross-join table elimination may be satisfied for one join operation, but may initially appear to be not satisfied for another join operation. However, after outer-join table elimination or cross-join table elimination is performed with respect to the outer join operation that satisfies the conditions, the other operation may now satisfy the conditions. Consider example query Q11:

Q11=SELECT DISTINCT T1.d, T1.z
   FROM T1 CROSS JOIN T2
     LEFT OUTER JOIN T3
        ON (T2.y=T3.y);

Example query Q11 comprises a first cross-join operation between table T1 and table T2. Example query Q11 also comprises a second operation between the preserved result set of the first join operation and non-preserved table T3. As written above, the first join operation, a cross join operation, does not appear to satisfy the conditions for cross-joined table elimination of table T2 since the second join operation, an outer-join operation performed after the first outer join-operation, includes a reference to table T2. Because the predicate T2.y=T3.y of the second join operation is applied after the first join operation, it is a post-join reference with respect to the first join. Thus, it appears that cross-joined table elimination may not be performed with respect to the first join operation and table T2.

The second join operation, an outer join operation, satisfies the conditions to perform outer-joined table elimination of non-preserved table T3, since (1) example query Q11 contains no references to table T3 to be processed after the second outer join, and (2) example query Q11 is duplicate-insignificant. Table T3 can be removed from example query Q11, which yields the transformed query Q11', provided below.

Transformed Query Q11':
Q11'=SELECT DISTINCT T1.d, T1.z
   FROM T1 CROSS JOIN T2;

In transformed query Q11', the remaining cross join operation between table T1 and table T2 now satisfies the conditions to perform cross-joined table elimination of table T2, since (1) transformed query Q11' contains no references to table T2 to be processed after the cross join, and (2) transformed query Q11' is duplicate-insignificant. Thus, transformed query Q11' may be further transformed, yielding transformed query Q11", provided below:

Transformed Query Q11":
Q11"=SELECT DISTINCT T1.d, T1.z
   FROM T1;

Although a cascade is shown between a first join that is a cross join and a second join that is an outer join, the cascade can be between two or more cross joins, two or more outer joins, or two or more of any combination thereof.

Method for Outer-Joined Table Elimination

FIG. 1A is a flow diagram that illustrates an embodiment of a process for outer-joined table elimination for duplicate-insignificant queries. Process 100 may be performed by one or more computing devices, including but not limited to one or more database servers.

At block 102, a query specifying an outer join, such as a left outer join or a right outer join, is received. In one embodiment, the query is received or otherwise accessed by a query processor of a database server. The query specifies an outer join between a first table and a second table. In one embodiment, the outer join is between a first table and a second table, where the first table is preserved and the second table is non-preserved. In one embodiment, when the query comprises a right outer join, the right outer join is transformed into a left outer join.

At decision block 104, it is determined if the query contains any reference to the second table to be processed after the outer join. In one embodiment, the reference to the second table comprises a filter condition and/or a reference in the SELECT clause of the query. If it is determined that the query contains a reference to the second table to be processed after the outer join, processing proceeds to block 110. In this case, the query does not satisfy the conditions for performing outer-joined table elimination, and the query is executed without performing outer-joined table elimination. Otherwise, if it is determined that the query does not contain any reference to the second table to be processed after the outer join, processing proceeds to decision block 106.

At decision block 106, it is determined if the query is duplicate-insignificant. If it is determined that the query is not duplicate-insignificant, processing proceeds to block 110. In this case, the query does not satisfy the conditions for performing outer-joined table elimination, and the query is executed without performing outer-joined table elimination. Otherwise, if it is determined that the query is duplicate-insignificant, processing proceeds to block 108.

At block 108, the query is transformed into a second query, wherein the outer join and the second table are eliminated from the second query. Block 108 is reached when the conditions for performing outer-joined table elimination are satisfied.

At block 110, the query is executed. When it is determined that the query does not contain references to the second table to be processed after the outer join (i.e. decision block 104) and that the query is duplicate-insignificant (i.e. decision block 106), the query is executed at block 110 after transforming the query by performing outer-joined table elimination the second table (i.e. block 108). Otherwise, when these two conditions are not met, the query is executed without transforming the query by performing outer-joined table elimination.

Method for Cross-Joined Table Elimination

Figure 1B:
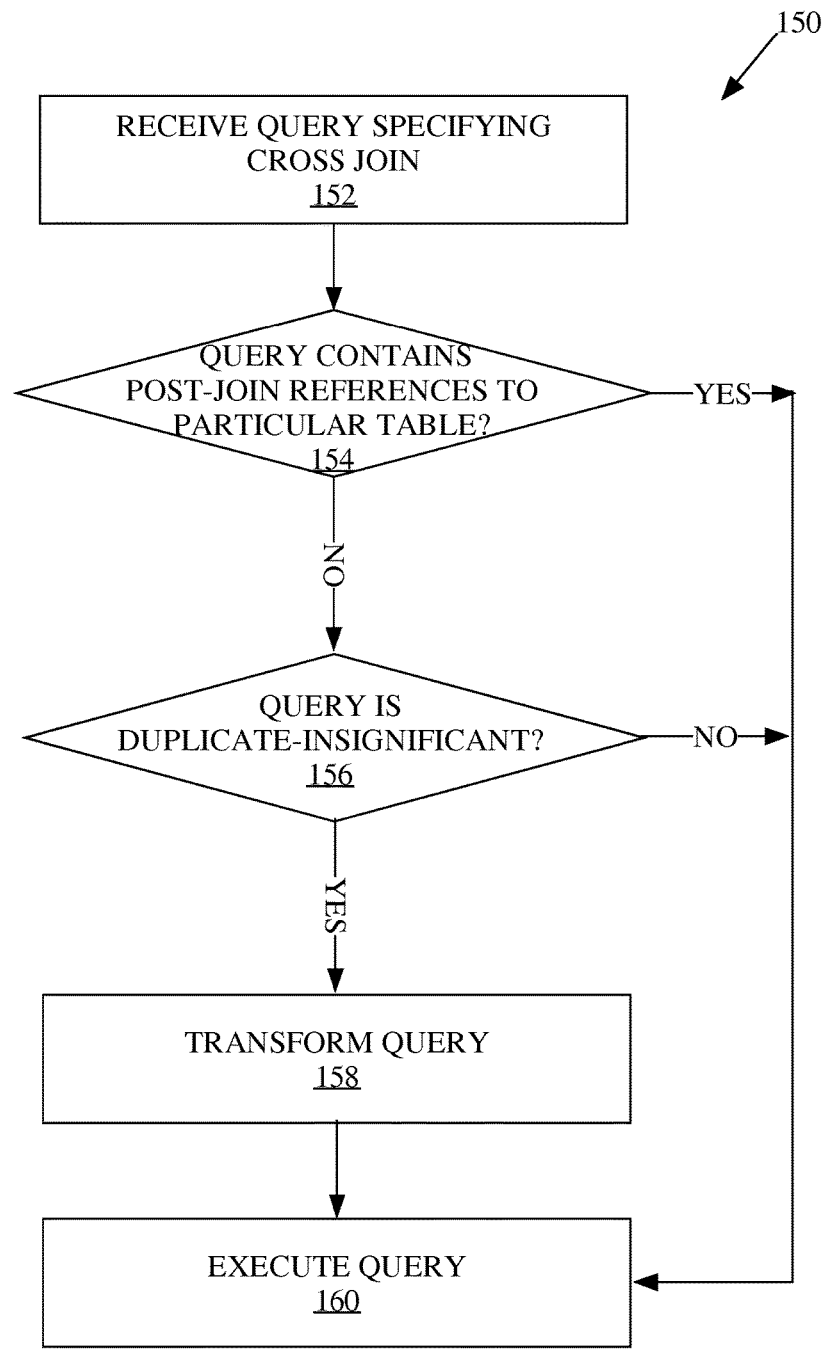
FIG. 1B is a flow diagram that illustrates an embodiment of a process for cross-joined table elimination for duplicate-insignificant queries.

FIG. 1B is a flow diagram that illustrates an embodiment of a process for cross-joined table elimination for duplicate-insignificant queries. Process 150 may be performed by one or more computing devices, including but not limited to one or more database servers.

At block 152, a query specifying a cross join is received. In one embodiment, the query is received or otherwise accessed by a query processor of a database server. In one embodiment, the cross join is between a first table and a second table, where either or both the first table or the second table is a suitable candidate to evaluate for cross-joined table elimination.

At decision block 154, it is determined if the query contains any reference to a particular table to be processed after the cross join. In one embodiment, the particular table is either the first table or the second table. The steps 154-156 may be performed on either of or both of the first table and the second table. If it is determined that the query contains a reference to the particular table to be processed after the cross join, processing proceeds to block 160. In this case, the query does not satisfy the conditions for performing cross-joined table elimination, and the query is executed without performing cross-joined table elimination. Otherwise, if it is determined that the query does not contain any reference to the particular table to be processed after the cross join, processing proceeds to decision block 156.

At decision block 156, it is determined if the query is duplicate-insignificant. If it is determined that the query is not duplicate-insignificant, processing proceeds to block 160. In this case, the query does not satisfy the conditions for performing cross-joined table elimination, and the query is executed without performing cross-joined table elimination. Otherwise, if it is determined that the query is duplicate-insignificant, processing proceeds to block 158.

At block 158, the query is transformed into a second query, wherein the cross join and the particular table are eliminated from the second query. Block 158 is reached when the conditions for performing cross-joined table elimination are satisfied.

At block 160, the query is executed. When it is determined that the query does not contain references to the particular table to be processed after the cross join (i.e. decision block 154) and that the query is duplicate-insignificant (i.e. decision block 156), the query is executed at block 160 after transforming the query by performing cross-joined table elimination the second table (i.e. block 158). Otherwise, when these two conditions are not met, the query is executed without transforming the query by performing cross-joined table elimination.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on sepaRate Computers, Including Separate Server Blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 2:
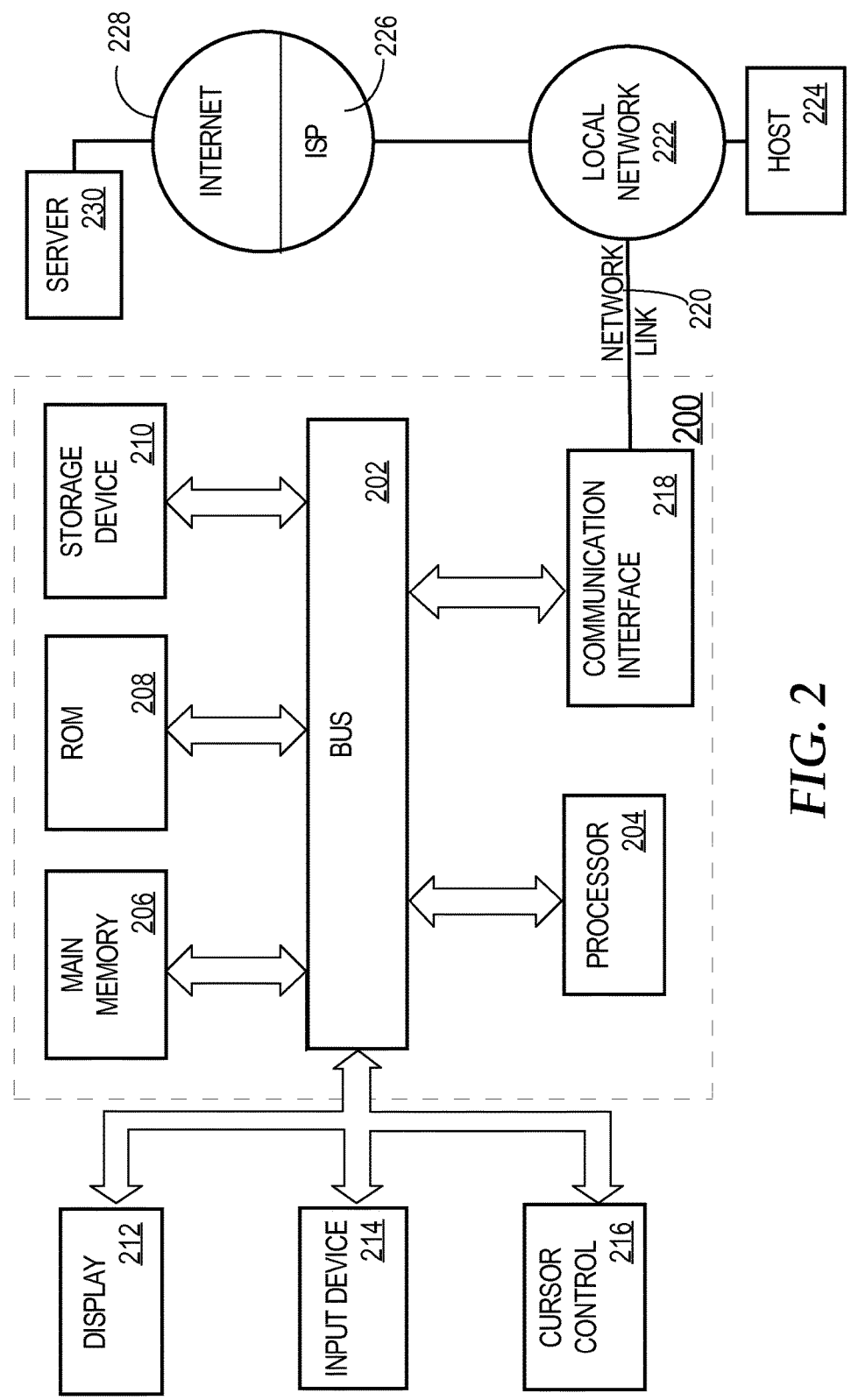
FIG. 2 illustrates a computer system upon which one or more embodiments may be implemented.

For example, FIG. 2 is a block diagram that illustrates a computer system 200 upon which an embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk, optical disk, or solid-state drive is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid-state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   for a query comprising a query block specifying a first join between a first table and a second table, making a first determination that the query block contains no post-join references to the second table to be processed after the first join, wherein the query block does not reference the second table in a SELECT, GROUP-BY, HAVING, or ORDER BY clause or subquery connecting or correlating conditions of the query block;
   wherein the first join is one of an outer join and a cross join;
   making a second determination that the query block is duplicate-insignificant; and
   in response to making the first determination and the second determination, transforming the query into a transformed query, wherein the second table is eliminated from a corresponding query block in the transformed query;
   wherein the method is performed by one or more computing devices.

2. The method of claim 1, wherein the first join is an outer join, the first table is a preserved table with respect to the outer join, and the second table is a non-preserved table with respect to the outer join.

3. The method of claim 1, wherein the first join is a cross join.

4. The method of claim 1, wherein at least one of the first table and the second table is a base table or a view table.

5. The method of claim 1, wherein the first join is eliminated from the corresponding query block in the transformed query.

6. The method of claim 1, wherein at least one predicate referencing the second table is eliminated from the corresponding query block in the transformed query.

7. The method of claim 1, wherein the second determination that the query block is duplicate-insignificant is made if the query block comprises a DISTINCT operator, and a SELECT clause of the query block does not contain an aggregate function that is not duplicate-insignificant.

8. The method of claim 1, wherein the second determination that the query block is duplicate-insignificant is made if:
   the query block comprises at least one of a distinct aggregate function, a MIN( ), MAX( ), SUM(DISTINCT), COUNT(DISTINCT), or AGGREGATE (DISTINCT) aggregate function without a GROUP-BY clause unless all items of the GROUP-BY clause also appear in the SELECT clause;
   the query block does not comprise a MIN( ), MAX( ), SUM(DISTINCT), COUNT(DISTINCT), or AGGREGATE(DISTINCT) aggregate function and comprises a GROUP-BY clause such that all items of the GROUP-BY clause also appear in the SELECT clause of the query block;
   the query block is a UNION, INTERSECT, or MINUS query block;
   the query block is a semi-joined view or anti-joined view that originates from subquery unnesting transformations; or
   the query block is an ANY, ALL, [NOT] IN, or [NOT] EXISTS subquery.

9. The method of claim 1, further comprising:
   making a third determination that the corresponding query block of the transformed query specifies a second join between a third table and a fourth table, wherein the second join is one of an outer join and a cross join;

making a fourth determination that the corresponding query block of the transformed query contains no post-join references to the fourth table to be processed after the second join;

making a fifth determination that the corresponding query block of the transformed query is duplicate-insignificant;

in response to making the third determination, the fourth determination and the fifth determination, transforming the transformed query into a second transformed query, wherein the fourth table is eliminated from a second corresponding query block of the second transformed query.

10. One or more non-transitory storage media storing instructions which, when executed by one or more computing devices, cause:

for a query comprising a query block specifying a first join between a first table and a second table, making a first determination that the query block contains no post-join references to the second table to be processed after the first join, wherein the query block does not reference the second table in a SELECT, GROUP-BY, HAVING, or ORDER BY clause or subquery connecting or correlating conditions of the query block;

wherein the first join is one of an outer join and a cross join;

making a second determination that the query block is duplicate-insignificant; and in response to making the first determination and the second determination, transforming the query into a transformed query, wherein the second table is eliminated from a corresponding query block in the transformed query.

11. The one or more non-transitory storage media of claim 10, wherein the first join is an outer join, the first table is a preserved table with respect to the outer join, and the second table is a non-preserved table with respect to the outer join.

12. The one or more non-transitory storage media of claim 10, wherein the first join is a cross join.

13. The one or more non-transitory storage media of claim 10, wherein at least one of the first table and the second table is a base table or a view table.

14. The one or more non-transitory storage media of claim 10, wherein the first join is eliminated from the corresponding query block in the transformed query.

15. The one or more non-transitory storage media of claim 10, wherein at least one predicate referencing the second table is eliminated from the corresponding query block in the transformed query.

16. The one or more non-transitory storage media of claim 10, wherein the second determination that the query block is duplicate-insignificant is made if the query block comprises a DISTINCT operator, and a SELECT clause of the query block does not contain an aggregate function that is not duplicate-insignificant.

17. The one or more non-transitory storage media of claim 10, wherein the second determination that the query block is duplicate-insignificant is made if:

the query block comprises at least one of a distinct aggregate function, a MIN( ), MAX( ), SUM(DISTINCT), COUNT(DISTINCT), or AGGREGATE(DISTINCT) aggregate function without a GROUP-BY clause unless all items of the GROUP-BY clause also appear in the SELECT clause;

the query block does not comprise a MIN( ), MAX( ), SUM(DISTINCT), COUNT(DISTINCT), or AGGREGATE(DISTINCT) aggregate function and comprises a GROUP-BY clause such that all items of the GROUP-BY clause also appear in the SELECT clause of the query block;

the query block is a UNION, INTERSECT, or MINUS query block;

the query block is a semi-joined view or anti-joined view that originates from subquery unnesting transformations; or the query is an ANY, ALL, [NOT] IN, or [NOT] EXISTS subquery.

18. The one or more non-transitory storage media of claim 10, wherein the instructions, when executed by the one or more computing devices, further cause:

making a third determination that the corresponding query block of the transformed query specifies a second join between a third table and a fourth table;

making a fourth determination that the corresponding query block of the transformed query contains no post-join references to the fourth table to be processed after the second join;

making a fifth determination that the corresponding query block of the transformed query is duplicate-insignificant;

in response to making the third determination, the fourth determination and the fifth determination, transforming the transformed query into a second transformed query, wherein the fourth table is eliminated from a second corresponding query block of the second transformed query.

* * * * *

UNITED STATES PATENT AND TRADEMARK OFFICE
CERTIFICATE OF CORRECTION

PATENT NO. : 9,965,516 B2
APPLICATION NO. : 14/284248
DATED : May 8, 2018
INVENTOR(S) : Ahmed et al.

Page 1 of 1

It is certified that error appears in the above-identified patent and that said Letters Patent is hereby corrected as shown below:

In the Specification

In Column 8, Line 38, delete "SUM()" and insert -- SUM(); --, therefor.

In Column 8, Line 42, after "BY" insert -- clause;
Query blocks with a distinct aggregate function, MIN(), MAX(), SUM(DISTINCT), COUNT(DISTINCT), OR AGGREGATE (DISTINCT) aggregate functions with a GROUP-BY --.

In Column 9, Line 16, delete "(T1y" and insert -- (T1.y --, therefor.

In Column 9, Line 43, delete "QuerY" and insert -- Query --, therefor.

In Column 13, Lines 39-40, delete "sepaRate Computers, Including Separate Server Blades." and insert -- separate computers, including separate server blades. --, therefor.

Signed and Sealed this
Sixth Day of November, 2018

Andrei Iancu
*Director of the United States Patent and Trademark Office*